(12) United States Patent
Cass et al.

(10) Patent No.: US 8,621,418 B2
(45) Date of Patent: Dec. 31, 2013

(54) INTERLINKED CHANGE-REQUEST COMPUTER SYSTEM AND METHOD HAVING ROLE-BASED TABULAR INTERFACE

(75) Inventors: Judith H. Cass, Hudson, MA (US); Geoffrey M. Clemm, Concord, MA (US); Catherine G. Col, Gloucester, MA (US); Leendert P. Geffen, West Roxbury, MA (US)

(73) Assignee: International Business Machines Corporation, Armonk, NY (US)

( * ) Notice: Subject to any disclaimer, the term of this patent is extended or adjusted under 35 U.S.C. 154(b) by 1941 days.

(21) Appl. No.: 11/555,491

(22) Filed: Nov. 1, 2006

(65) Prior Publication Data
US 2008/0028005 A1    Jan. 31, 2008

Related U.S. Application Data

(63) Continuation-in-part of application No. 11/459,743, filed on Jul. 25, 2006.

(51) Int. Cl.
*G06F 9/44* (2006.01)

(52) U.S. Cl.
USPC ........................................................ 717/103

(58) Field of Classification Search
USPC .......... 717/100–103, 168; 705/35, 7.12, 7.19, 705/2, 7.15; 726/2; 714/38.13, 38.11; 707/999.203, 999.102, 999.004, 610; 715/708
See application file for complete search history.

(56) References Cited

U.S. PATENT DOCUMENTS

| | | | |
|---|---|---|---|
| 4,809,170 A | 2/1989 | Leblang et al. | |
| 6,101,481 A * | 8/2000 | Miller | 705/7.13 |
| 6,714,913 B2 * | 3/2004 | Brandt et al. | 705/2 |
| 7,330,822 B1 * | 2/2008 | Robson et al. | 705/7.15 |
| 7,516,438 B1 * | 4/2009 | Leonard et al. | 717/102 |
| 7,631,006 B2 * | 12/2009 | Hagstrom et al. | 707/999.102 |
| 7,640,548 B1 * | 12/2009 | Yu et al. | 718/106 |
| 7,840,944 B2 * | 11/2010 | Brunswig et al. | 717/124 |
| 2002/0049962 A1 * | 4/2002 | Kelbaugh et al. | 717/128 |
| 2003/0107591 A1 * | 6/2003 | Jameson | 345/744 |
| 2004/0030992 A1 * | 2/2004 | Moisa et al. | 715/513 |
| 2004/0117759 A1 | 6/2004 | Rippert, Jr. et al. | |
| 2005/0071355 A1 | 3/2005 | Cameron et al. | |
| 2005/0137928 A1 * | 6/2005 | Scholl et al. | 705/9 |
| 2005/0138031 A1 * | 6/2005 | Wefers | 707/9 |
| 2006/0031812 A1 * | 2/2006 | Olson et al. | 717/101 |
| 2006/0173879 A1 * | 8/2006 | MacFarlane et al. | 707/101 |
| 2006/0235736 A1 * | 10/2006 | Guckenheimer | 705/8 |
| 2007/0067772 A1 * | 3/2007 | Bustamante | 718/100 |
| 2007/0192156 A1 * | 8/2007 | Gauger | 705/8 |

\* cited by examiner

*Primary Examiner* — Tuan A Vu
(74) *Attorney, Agent, or Firm* — Hamilton, Brook, Smith & Reynolds, P.C.

(57) ABSTRACT

A computer method and apparatus for managing changes for a given software system is disclosed. The invention method and apparatus forms a respective change request object to represent each user's request to make a change to a given software system. For each change request object, the invention method/apparatus provides an issue hierarchy of issue objects, a task hierarchy of task objects and an activity hierarchy of activity objects. Each issue object represents a respective issue, each task object defines work needed to address a respective issue and each activity object tracks respective work performed. There is provided a tabular user interface including a table representation of the respective issue hierarchy, task hierarchy and activity hierarchy of a change request object. The table representation serves as a to-do list per user and displays issue object, task objects, and activity objects as a function of user role.

16 Claims, 7 Drawing Sheets

INTERLINKED CHANGE-REQUEST COMPUTER SYSTEM AND METHOD HAVING ROLE-BASED TABULAR INTERFACE

RELATED APPLICATION

This application is a continuation-in-part of U.S. application Ser. No. 11/459,743, filed Jul. 25, 2006, the entire teachings of which are incorporated herein by reference.

BACKGROUND OF THE INVENTION

Figure 1:
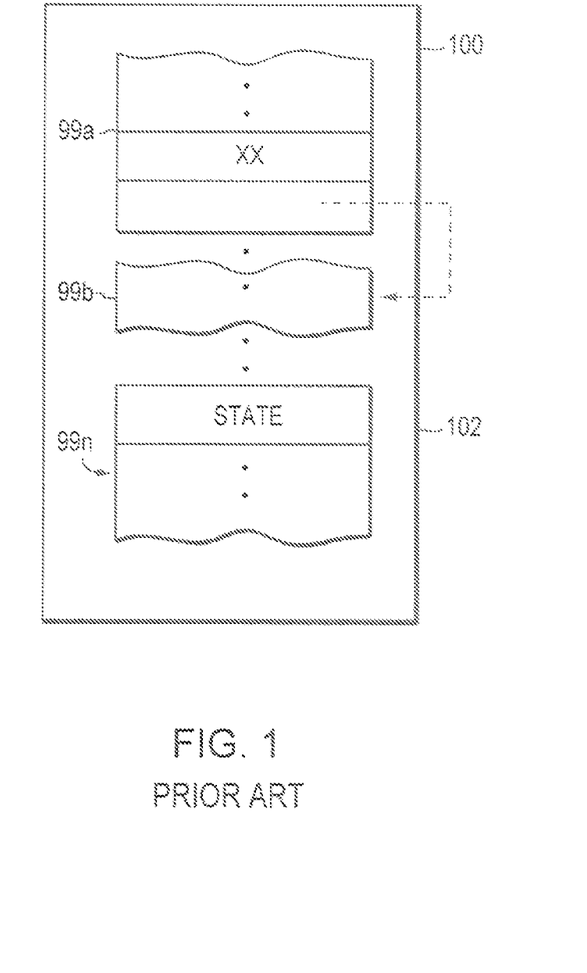
FIG. 1 is a block diagram of a change management repository of prior art.

Illustrated in FIG. 1 is a typical software change management repository 100 of the prior art. In a software change management repository 100, a set of objects 99 is maintained to capture the set of changes that have been requested by the developers and users of a software system. These changes request objects 99 are known by a variety of names in different change management repositories, such as Modification-Requests, Enhancement-Requests, Work-Items, Defects, and Bugs. In this disclosure, the term "Change-Request" is used to refer to these types of objects 99.

The information about a change request is captured in a set of properties of the Change-Request object 99. The property is represented by either an atomic value (such as a string, an integer, or a date) or a reference to another object 99 as illustrated by the 'XX' and dotted line arrow, respectively, of object 99a in FIG. 1. Some properties are pre-defined and present on all Change-Request objects 99, but most properties are determined by a customer, and can vary from project to project. The current state of a change request is summarized in a pre-defined State property 102 of the Change-Request object 99. Although the State property 102 is pre-defined, the legal values of the State property are determined by a customer. The customer defines a set of allowed transitions from one State value to another, and defines the actions that perform those transitions.

Some key problems with maintaining the state of a Change-Request object 99 are as follows:
1. Different stake-holders in the change management process have different perspectives on what the current state of a given Change-Request should be. For example, a developer might believe that the Issue is resolved, while the submitter of the Issue believes the Issue requires further work. One approach to this problem is to introduce composite states such as "open-development-pending", "open-development-complete" and, "closed-development-complete". This approach results in a combinatorial explosion in the number of states as the number of stake-holders in the Change-Request management process increases, which makes it difficult to introduce new stake-holders to the change management process.
2. Multiple users of a software system might report similar problems. If each of these problems is entered as a separate Change-Request object 99, it is error-prone and expensive to update the properties of each of these Change-Request objects as the problem is being resolved. If only a single Change-Request object 99 is used to track all of these problems, then it is difficult to capture important distinctions between the submitters of the problem, such as what release of the system was demonstrating the problem, and whether the problem has been resolved on the particular platform or product variant needed by a given user.
3. A given Change-Request might need to be resolved in different ways in multiple releases or variants of a given software system. It is important to be able to independently track how work is progressing in each of these releases or variants, but if there are separate Change-Request objects 99 for each release or variant, it is error-prone and expensive to update the problem description information on each of those change requests.
4. A given set of changes might be able to contribute to the completion of multiple tasks (especially when they are tasks to fix the same problem in different releases or variants of the software system). It is error-prone and expensive to be updating the multiple Change-Request objects 99 as work on that single activity progresses.
5. Different stake-holders in the change management process might be working at different sites with different replicas of the change management repository 100, or working disconnected with a personal replica of a subset of the change management repository 100. When multiple replicas are in use, different stake-holders can unwittingly modify the Change-Request object 99 in incompatible ways, resulting in difficult merge scenarios that require expensive manual merging or result in loss of information from automated merging. A standard solution to this problem is to assign one replica of the repository 100 as the master of a given Change-Request, and only users accessing that replica of the repository 100 can make any modifications to that Change-Request object 99. But this results in serious delays and loss of information as stake-holders wait for mastership to be transferred to their replica.

SUMMARY OF THE INVENTION

In parent U.S. patent application Ser. No. 11/459,743 a software change management repository maintains a set of objects to capture the set of changes that have been requested by the developers and users of a software system. In order to accurately track the status of the different stake-holders for a given change request, a Change-Request object is partitioned into a set of linked sub-object hierarchies: namely, one Issue hierarchy, zero or more Task hierarchies, and zero or more Activity hierarchies. A given Task can be associated with multiple Issues (and therefore contribute to multiple Change-Requests), and a given Activity can be associated with multiple Tasks (and therefore contribute to multiple Change-Requests).

One of the user interfaces for a stake-holder in the change request management process is a tabular "to-do" list, where the list (table) contains the set of change-request objects upon which the stake-holder should perform some action. Some of these actions cause a given change-request object to be removed from this stake-holder's to-do list (the goal of any particular stake-holder is to get all change-requests, i.e., change request object, removed from his to-do list). But when a Change-Request is partitioned into a network of linked sub-object, where a given sub-object can be shared by multiple Change-Requests, it is unclear how to populate the rows of the to-do list table, since storing just the information of a particular sub-object in a given row would force the user to navigate around the rows to find related information, and would result in rows in the to-do list with incompatible fields, since different types of sub-objects have different types of fields. Alternatively, if information about related records is stored with each row for a given record, it is unclear what information from which related records should be displayed in the row of a record, what to do when there are multiple related records of the same type (which therefore have different values for the same columns in the table), and how to avoid the redundancy of having information in an object show up in the primary data of a column as well is in the related data of a variety of other objects.

The present invention addresses the above problems. In the present invention, the role of the user is used to select one of the types of sub-objects as being the primary sub-object. The different types of sub-objects of Change-Request are designed to partition the data according to the role of the user of the change request management system. In turn this ensures that the primary information for a given role of user is available for direct editing in the to-do list table. For example, if the role of the user is to discover and submit issues, the Issue is the primary sub-object for the to-do list for that user. If the role of the user is to identify work that needs to be performed to address an Issue, the Task is the primary sub-object for that user. If the role of the user is to make changes to software artifacts, the Activity is the primary sub-object for the to-do list for that user. The role of the user can be automatically determined from a role based change request management system, or otherwise it can be explicitly selected by the user. In case a given user acts in multiple roles, an operation is provided on the to-do list that makes it easy to switch the to-do list from one primary object to another.

In a preferred embodiment, a computer system and method manages changes for a given software system using the computer implemented steps of:

forming a respective change request object to represent each user's respective request to make a respective change to a given software system;

for each change request object, providing an issue hierarchy of issue objects, a task hierarchy of task objects and an activity hierarchy of activity objects each issue object representing a respective issue, each task object defining work needed to address a respective issue and each activity object for tracking respective work performed; and providing a tabular user interface including a table representation of the respective issue hierarchy, task hierarchy and activity hierarchy of a change request object, the table representation serving as a to-do list per user and displaying issue objects, task objects, and activity objects as a function of user role.

Accordingly, the present invention provides a computer method and apparatus for providing display of the data of interest to a given user (e.g., as a function of the user's role). Further the present invention provides a mechanism for creating new objects within a tabular form (representation of hierarchies of related objects and sub-objects) such that the new objects are automatically linked to the appropriate objects in the subject hierarchy.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 2A:
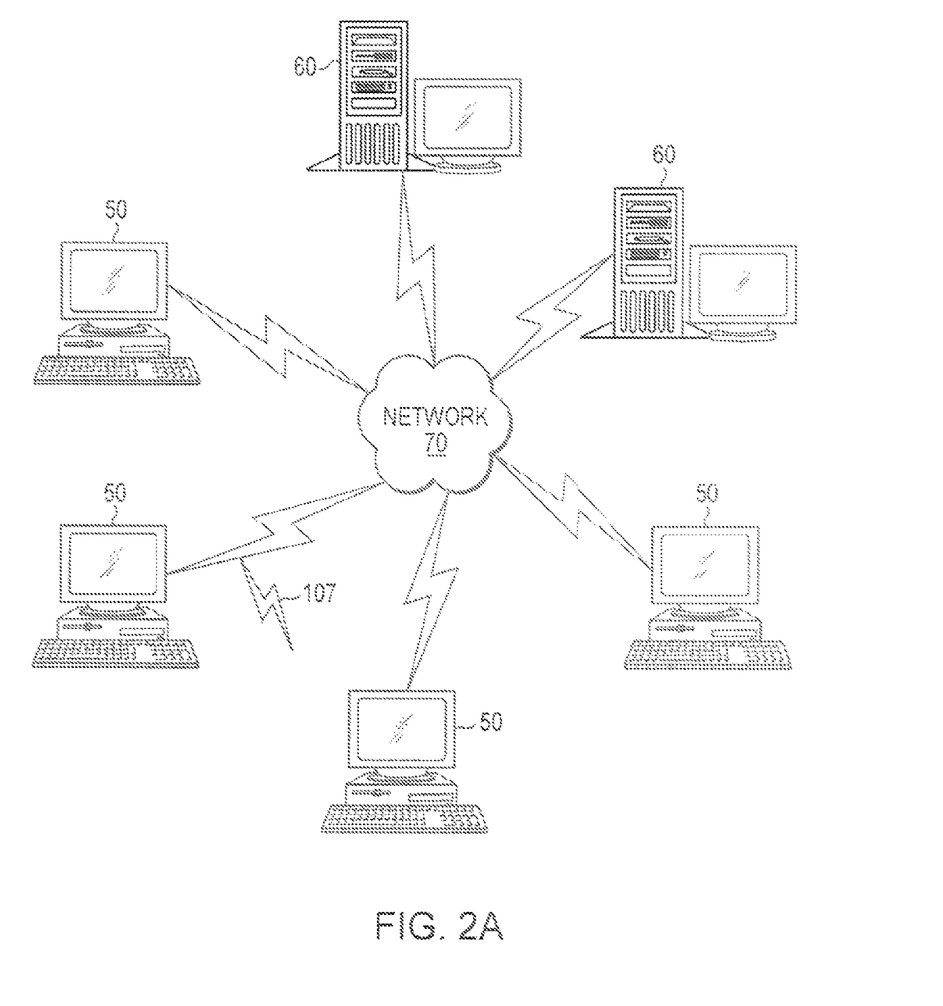
FIGS. 2a and 2b are schematic and block diagrams, respectively, of computer network and digital processing environment in which embodiments of the present invention are deployed.

FIG. 2a illustrates a computer network of similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers. Local area or Wide area networks, and gateways that currently use respective protocols (TCP/IP, Bluetooth, etc.) to communicate with one another. Other electronic device/computer network architectures are suitable.

Figure 2B:
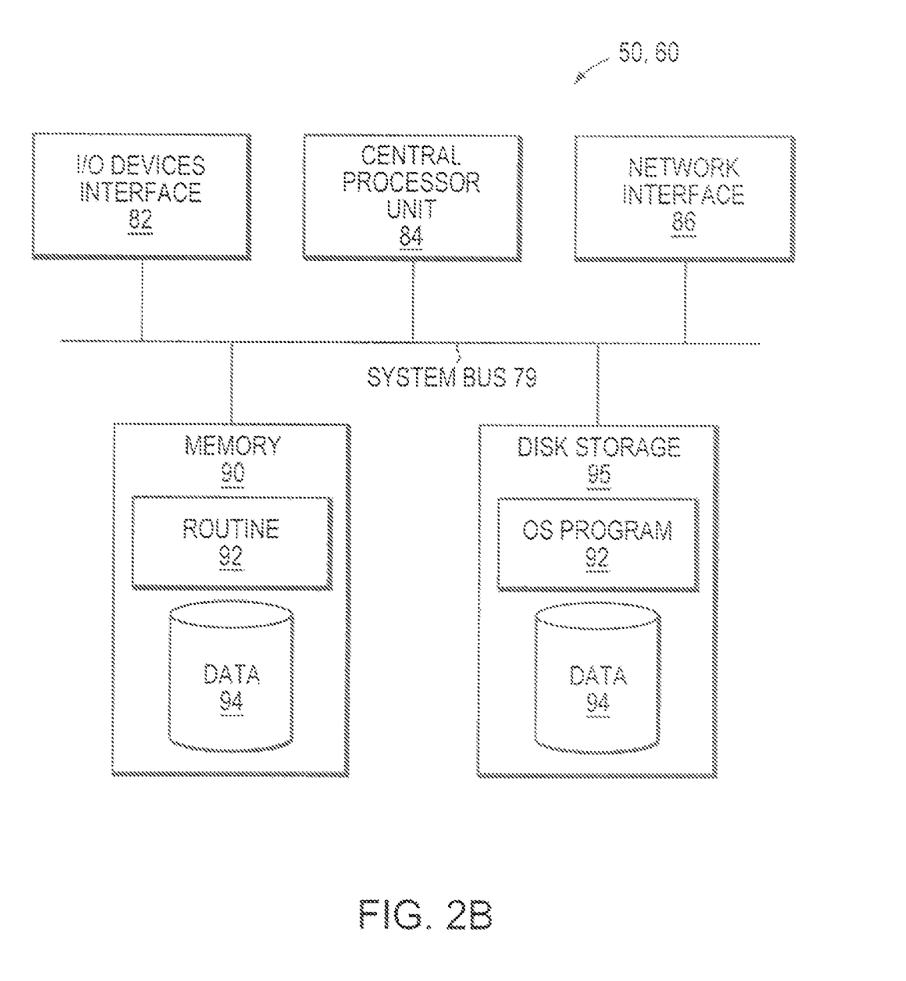

FIG. 2b is a diagram of the internal structure of a computer (e.g., client processor 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 2a). Memory 90 provides volatile storage for computer software instructions 92 and data 94 used to implement an embodiment of the present invention (e.g., change request objects 13, supporting table 41 and change request manager/system code 11 detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally reference 92), including a computer readable medium (e.g., a removable storage medium such as one or more DVD-ROMS's, CD-ROM's diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communications and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/programs 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagating medium, as described above for computer program propagated signal product.

Generally speaking, the term "carrier medium" or transient carrier encompasses the foregoing transient signals, propagated signals, propagation medium, storage medium and the like.

Figure 3:
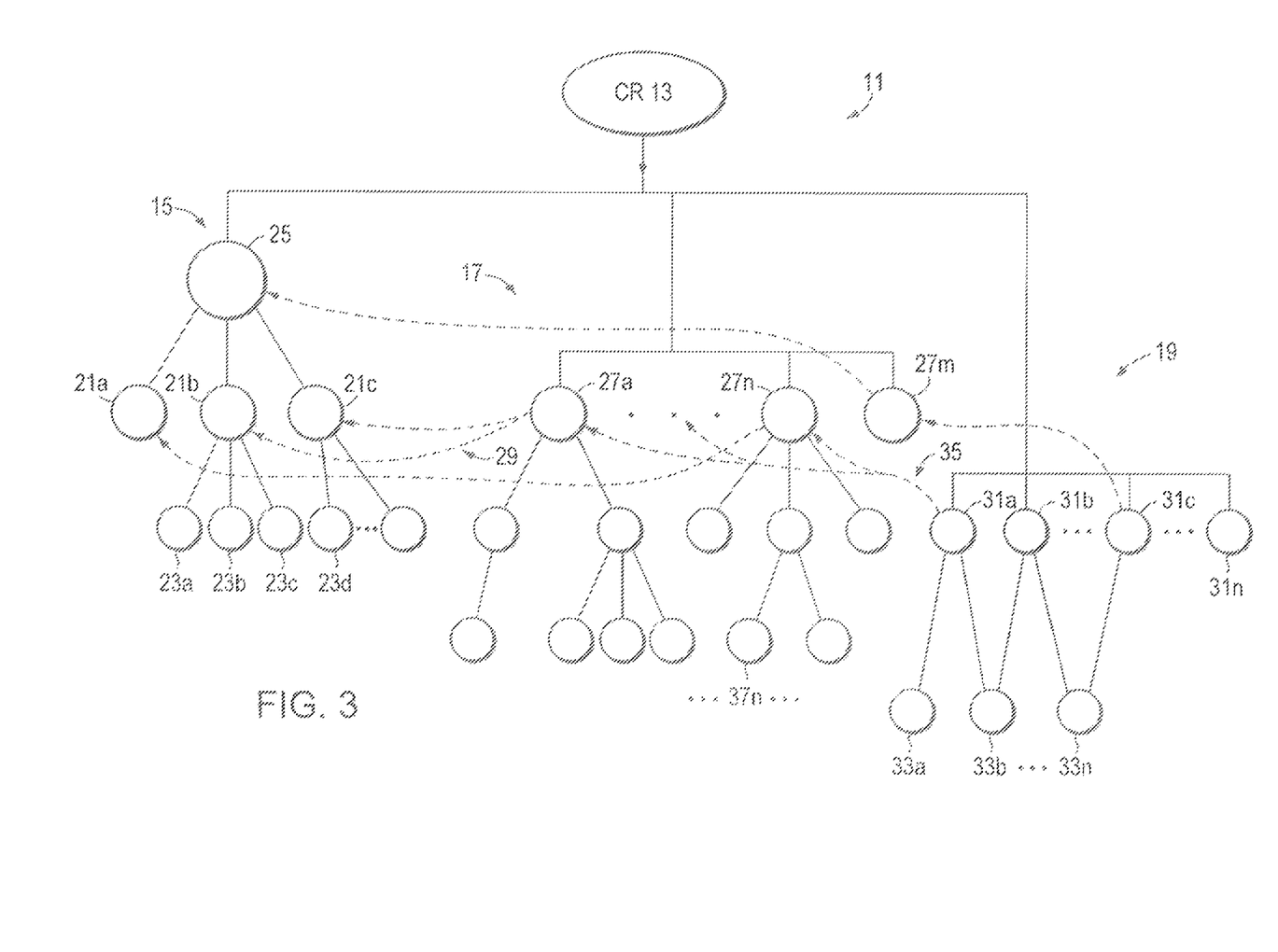
FIG. 3 is a schematic diagram of a change request object and object management system in embodiments of the present invention.

Illustrated in FIG. 3 is a change request object 13 employed in embodiments of the present invention. The change request object 13 is initiated in response to a given change request and stored in repositories 100 using similar first steps and technology of the prior art. Unlike prior art change request objects 99, however, the subject change request object 13 is partitioned into a set of sub objects 21, 23, 25, 27, 31, 33, 37. Each sub object is one of the sub object hierarchies, namely an Issue hierarchy 15, a Task hierarchy 17, and an activity hierarchy 19. Preferably, there is one Issue hierarchy 15, and there may be zero or more Task hierarchies 17 and zero or more Activity hierarchies 19. The subject hierarchies 15, 17, 19 are linked to each other as illustrated by links 29, 35, such that a given Task 27 can be associated with multiple Issues 21, 25 (and therefore contribute to multiple Change-Request), and a given Activity 31 can be associated with multiple Tasks 27 (and therefore contribute to multiple Change-Requests).

Some Issues can be logically decomposed into multiple sub-Issues, and respective sub-objects 23 of the Issue object 21 are created for each of those sub-Issues. When there are several software releases or variants in which an Issue 21, 25 is to be addressed, the system 11 creates a separate Task 27 for each release or variant, and links each Task 27 and its Sub-Tasks 37 to the Issue 21, 25 (as shown by dashed arrows 29 in FIG. 3). The Activity hierarchy 19 contains the changes made to perform a given Task 27. If one activity (represented by a respective object 31*a* for example) completes multiple tasks 27*a*, . . . 27*n*, system 11 associates the activity 31*a* with each of those tasks 27*a*, . . . 27*n* (as illustrated at 35 in FIG. 3). If one sub-activity 33 contributes to multiple activities 31, system 11 makes a sub-object 33 of each of those sub-activities.

Figure 4:
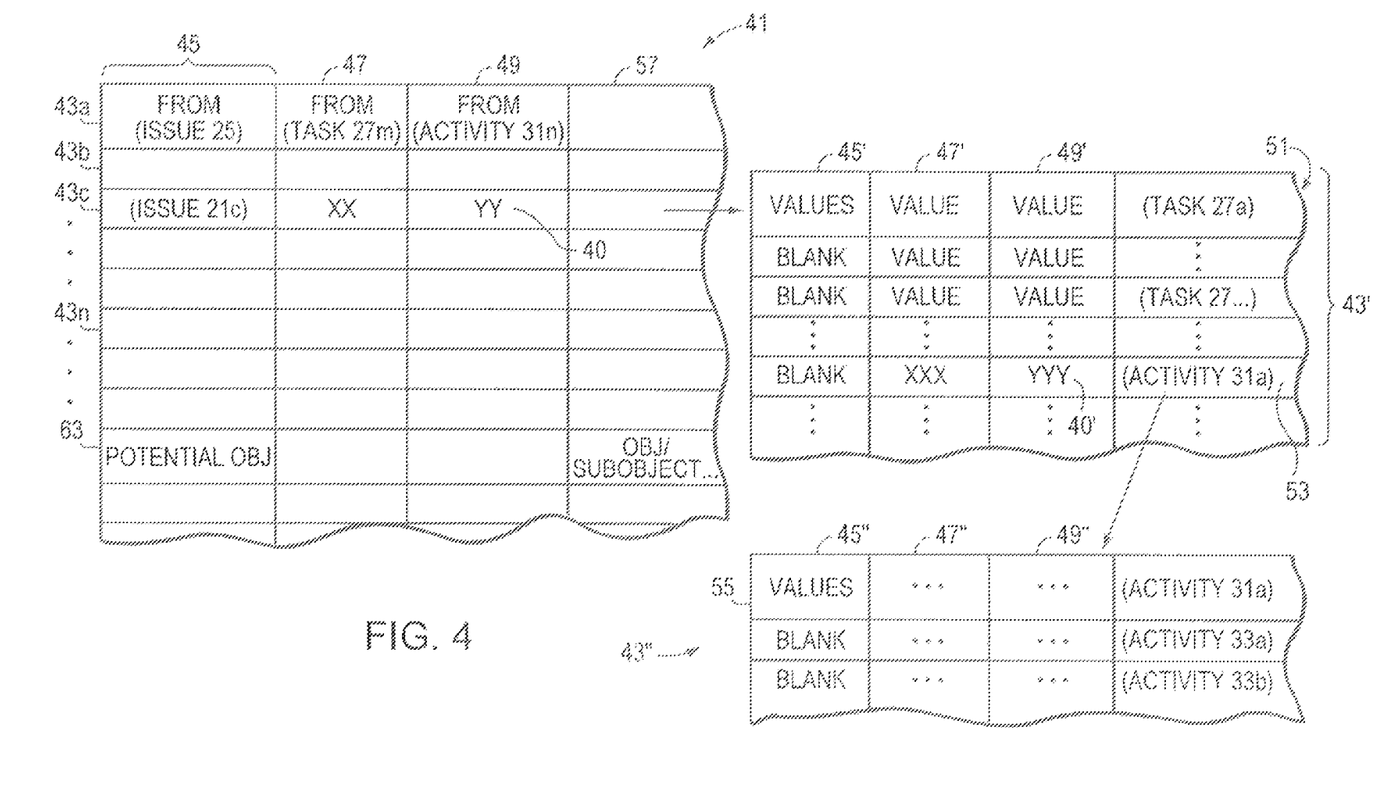
FIG. 4 is a block diagram of a to-do list table of the present invention utilized in the system of FIGS. 5a and 5b.

The present invention provides a tabular representation (or user interface) 41 of the linked hierarchy objects and sub-objects 21, 23, 25, 27, 31, 33, 37 of change requests 13 as shown in FIG. 4. The table 41 is formed of rows 43 intersected by columns 45, 47, 49, 57. Each row 43 represents a respective change request object 13, and table 41 effectively serves as a to-do list for users. In accordance with the present invention, the role of the user is used to select one of the types of hierarchy 15, 17, 19 objects (e.g., Issue, Task or Activity) as being the primary object for a given change request 13 (or row 43) of table 41.

The first columns 45 of the table 41 are reserved for holding and displaying the desired fields of the primary object which as mentioned above depends on the role of the user. As with most tabular displays, the user is given the choice of whether a particular field should be displayed, how wide a particular field should be, the order in which the fields should appear, and which fields are used to sort the rows of the table (which field is the primary sort key, which field is the secondary sort key, etc.). Techniques known in the art are employed to support such display aspects.

Following the columns 45 of the primary fields are the columns 47, 49 for the fields of the sub-objects that are linked to the primary object for the row 43 (respective change request object 13). Note that information from both directly and indirectly linked objects 21, 23, 25, 27, 31, 33, 37 are held and displayed in the columns 47, 49 of a row 43. For example, if the primary object is an Issue 21, the secondary column 47 contains fields from the Tasks 27, 37 that are linked to the Issue 21 (directly linked objects), and secondary column 49 contains fields from the Activities 31, 33 that are linked to these Tasks 27, 37 (indirectly linked objects).

In simple cases where there is at most one linked object of a given type, the fields from that single linked object are stored and displayed in the appropriate secondary column 47, 49. For example, say row 43*a* corresponds to change request object 13 of FIG. 3. If the primary object is an Issue 25 as a function of user role, then fields of Issue object 25 are indicated in first columns 45 of row 43*a* in table 41. A single Task 27*m* is linked to that Issue (issue object) 25 and the fields from that corresponding task object 27*m* are held and displayed in the secondary column 47 of row 43*a* of table 41. Further Task 27*m* is linked to a single Activity 31*n*. The fields from the corresponding Activity object 31*n* are stored and displayed in the secondary column 49 of row 43*a* in table 41.

As can be imagined, in many cases, an object/sub-object of one type is linked to many other objects/sub-object of another type. In this case, a "summary" value 40 is indicated for that field, where the summary value 40 of a given field is the result of a function that takes as input a set of values with the type of that field, and produces as output a single value with the type of that field. For example, a summary function for an integer-valued field might be a function that computes that average of a set of input integers, while a summary function for a date-valued field might be the earliest date from the set of input dates. For pre-defined fields, there are pre-defined summary functions, but these functions can be overridden in a given to-do list table 41 by a custom summary function. For customer-defined fields, there is a pre-defined summary function based on the type of the value of the customer-defined field, but a customer can define a customer default summary function for each type of field. The cells in secondary columns 47, 49 that contain summary values 40 are displayed in a distinctive way in table 41, so that the user can easily determine when a summary value 40 is being displayed and when a direct value is being displayed. Known techniques are employed, such as color schemes, different fonts/font effects, flashing, blinking or other highlighting of table values and the like.

When a summary value 40 appears in a secondary column 47, 49 because multiple sub-objects are linked to the primary object, as user will sometimes want to be able to inspect the specific field values of the individual objects that contributed to that summary value 40. To allow the user to inspect these individual values without losing the context of the table 41 data, system 11 enables the user to "expand" the table row 43 containing summary values 40. This results in a list 43' of rows, but only the initial row 51 in the resulting list 43' contains primary values. The other rows in the resulting list 43' contain no values (indicated as "blank" in FIG. 4) in the primary columns 45' to make it clear to the user that these are expansion rows (first set) 43'. Columns 47' and 49' of expanded list 43' hold appropriate field values or summary values 40' (further discussed below) of corresponding sub-objects.

For example, in a given row 43c of initial table 41, if an Issue is the primary object and the Issue object 21c is linked to multiple Task (task objects) 27a ... etc., a user can expand that given row 43c. The row expansion results in a set of rows 43' for that Issue 21c (one row for each Task 27a that is linked to that Issue 21c). In case the primary object is directly linked to more than one instance of one type of object (in the example, Issue 21c is linked to more than one Task 27), and one of the linked objects is in turn linked to multiple instances of another type of object (in the example, one of the linked Tasks 27a is linked to multiple Activities 31a, 33a, 33b), the expand operation on the row 43c for that primary object 21c only expands the directly linked object (in the example, a respective row is created for each directly linked Task 27a ... ), and the indirectly linked objects are still displayed in summary from (in the example, the Activity 31a information for directly linked Task 27a is summarized at 40' in rows 53 of expanded set 43' where there are multiple Activities 31a, 33a, 33b linked to that Task 27a).

In this case, row 53 of the expanded row set 43' can then be further expanded to second set (level) 43". This expansion at 43" produces one row for each object that is linked to the linked object represented by the subject row 53. In the example, the row 53 having a summary value 40' can be expanded upon user command to have a separate row for each Activity 33a, 33b linked to the corresponding Activity 31a (of Task 27a). As with the first level of expansion at 43', in which the primary columns 45' for all except the first row 51 are left empty, with the second level of expansion at 43", the primary columns 45" for the rows corresponding to directly linked sub-objects 33 are blank except for the first row 55 for that directly linked Activity object 31a. Secondary columns 47", 49" hold and display pertinent sub-object field values.

One problem with having rows in the to-do list table 41 only for primary objects occurs when the user needs to create a new object. Although a new Issue object 21, 23 25 is usually created by a top-level "create-Issue" operation, a new Task or Activity object 27, 31 is usually created by applying an operation on an existing sub-object, which then both creates the Task 27 or Activity 31 and links it to that existing sub-object. For example, an "investigate" operation on an Issue sub-object 21, 23 creates a new Task object 27 that is linked to that Issue, and a "work-on" operation on a Task sub-object 37n creates a new Activity object 31 that is linked to that Task. But in this invention, the to-do list table 41 has rows only for existing primary objects, so the user would not have the appropriate sub-object in the table unless he is creating a primary object for a sub-object that is already linked to at least on primary sub-object (which is never the case initially in the preferred embodiment).

In addition, even for sub-objects that are linked to existing primary object, if more than one sub-object is related to an existing primary object, these sub-objects by default are collapsed into a single set of summary fields 40, so it would not be easy to find the desired sub-object without expanding all of the summary fields, 40, 40' (which would eliminate many of the benefits of the invention).

To solve the above problems, a "potential-new-object" query is associated with the to-do list table 41. This query searches for records (rows and/or expanded rows 43, 43', 43") of the type of object that a user with this role would usually apply a "create"-type operation against (for example, Issue objects 21, 23, 25 for a user whose primary objects are Task objects 27, and Task objects 27, 37 for a user whose primary objects are Activity objects 31). System 11 adds a work row 63 to the to-do list table 41 for each object that matches the potential-new-object query. Preferably system 11 indicates the information returns by the query in a "related information" column 57. The newly added work row 63 then represents a "potential primary object" instead of an actual primary object, and the primary columns 45 of new work row 63 are displayed with special default values that indicate that this is a potential object. The user is then given a standard "create" operation that can be applied to any potential object row 63. The primary columns 45 in the potential object row 63 are editable so that a user can specify information needed to initialize the potential new object when the "create" operation is applied to the object of that row.

Figure 5A:
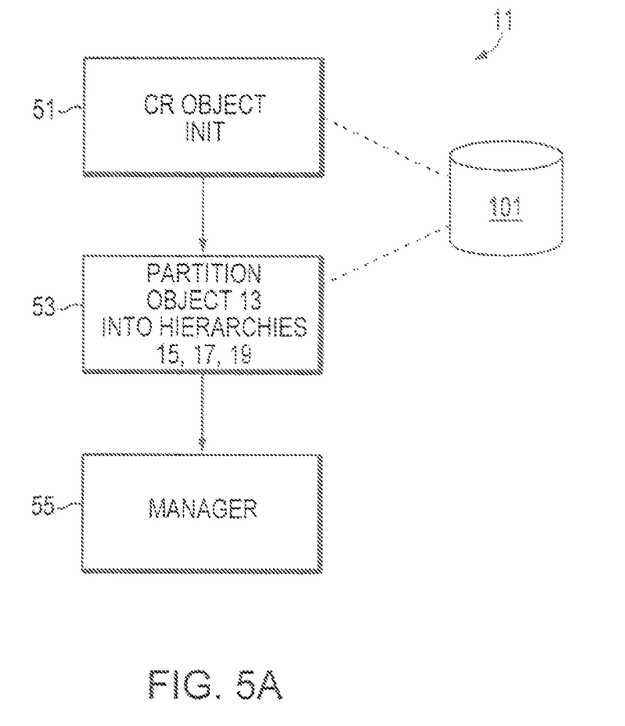
FIGS. 5a-5b are flow diagrams of one embodiment of the present invention.
Figure 5B:
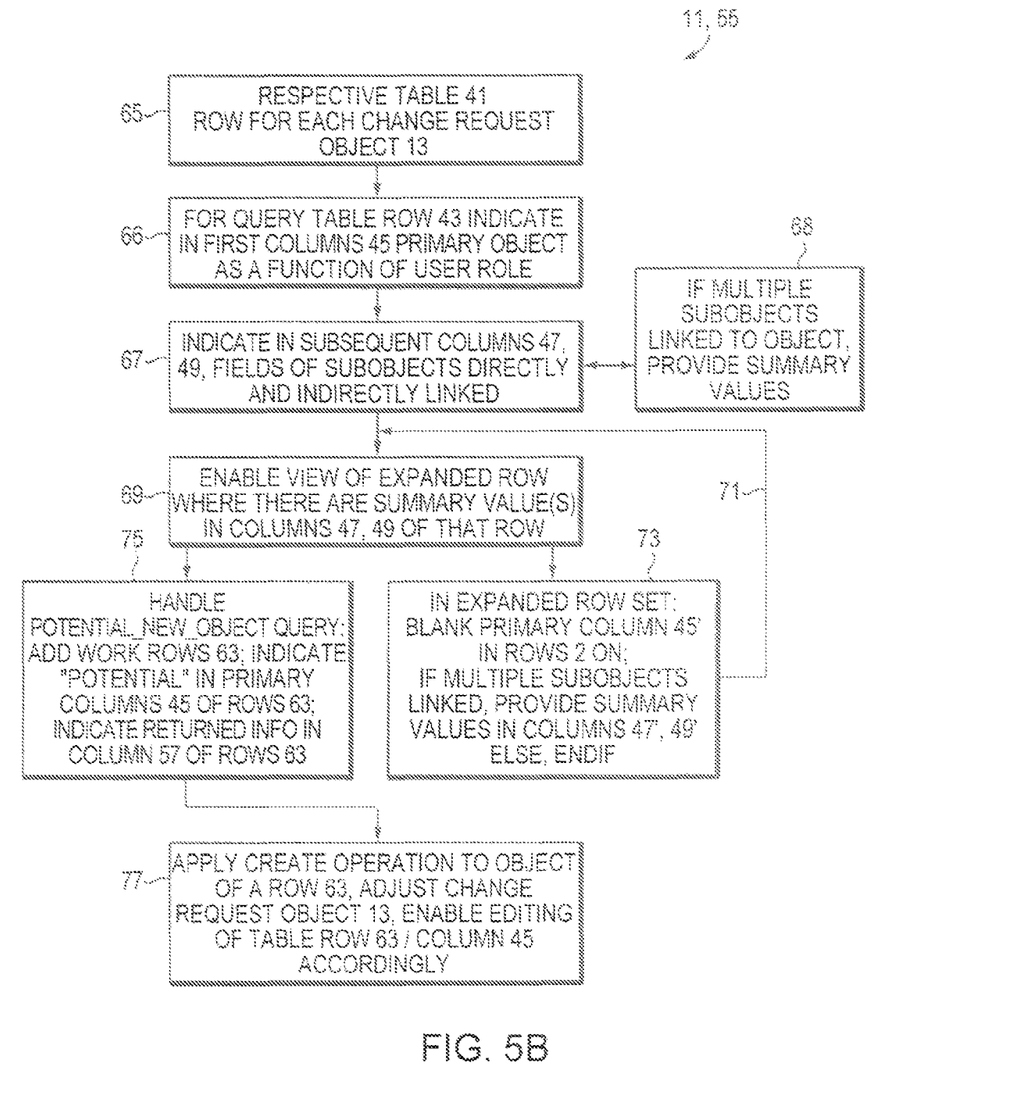

According to the foregoing, embodiments of the present invention employ a Change Request object creator 51, partitioning means 53 and Change Request management means (manager system) 55 as shown in FIGS. 5a-5b. In response to user request to change a subject software system (program or the like), invention system 11 through Change Request object creator 51 initiates a Change Request object 13. Techniques known in the art may be employed to implement Change Request object creator 51. Creator 51 stores initiated Change Request objects 13 in a repository 101 similar to the change management repositories 100 of prior art.

Partitioning means 53 generates the issue hierarchy 15, task hierarchy 17 and activity hierarchy 19 corresponding to a Change Request object 13 stored in repository 101. Linked objects, tree structures and other data structures are employed as discussed in related (parent) application Ser. No. 11/459,743 herein incorporated by reference.

Change Request management means 55 maintains associations between activity objects 31, task objects 27 and issue/root objects 21, 25. Change Request management means 55 computes and maintains status values and other values of the objects 21, 23, 25, 27, 31, 33, 37 in the hierarchies 15, 17, 19 according to techniques and methods in parent U.S. application Ser. No. 11/459,743. Further, manager 55 computes and maintains the to-do list table 41 of Change Request objects 13 for each user according to the role of that user.

With reference to FIG. 5b, manager 55/system 11 creates and maintains (step 65) and entry (row 43) in table 41 for each change request object 13. For a given table row 43, system 11/manager 55 indicates in first column (primary column) 45 the primary object as a function of user role (step 66). Cross referencing tables of users and users' roles or other common techniques for this purpose are employed. Continuing with step 67, system 11 indicates in subsequent columns 47, 49 of table 41 the fields of sub-objects directly and indirectly linked to the primary object. If multiple sub-objects are linked to the primary object, then at step 68 system 11 provides summary values in columns 47, 49. In turn, system 11 enables a user to view a subject row 43 in an expanded version where the constituents of the summary values in columns 47, 49 of that row are displayed (step 69). Upon user selection or command to expand the subject row 43, step 73 displays the expanded row set 43'. In the expanded row set 43', system 11 (at step 73) indicates in form, style and the like that the current view is an expanded portion of the main view for table 41. In one embodiment, step 73 displays the expanded row 43' having blank primary column 45' for all rows but the first row. If multiple sub-objects are linked to the primary object of the expanded row set 43', then step 73 provides summary values in secondary columns 47', 49' and loops back to step 69 which enables the user to expand the view further. Loop 71 enables a user to layer by layer expand row 43 of table 41 where summary values 40, 40' are displayed in columns 47, 49, 47', 49' of that row.

Continuing on the step 75, system 11/manager 55 supports the "potential-new-object" query by a user. In response to the user issuing such a query, step 75 adds appropriate work rows 63 to table 41 (one new row 63 for each object found that matches the query). In each added work row 63, system 11 indicates in primary column 45 of that row the potential of a new object in the hierarchy of change request object 13. Step 75 also indicates the searched and returned object/sub-object information in column 57 of work rows 63.

System 11 provides to the user a "create" operation. Upon user selection of the create operation, step 77 applies that operation to the corresponding object of a given work row 63 (as selected by the user) and adjusts the change request object 13 (within hierarchies 15, 17, 19) accordingly. System 11 also at Step 77 enables user editing of the primary column 45 in the given row 63 to update indication of the corresponding object from "potential" to a now-existing object/sub-object.

While this invention has been particularly shown and described with references to example embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 2a and 2b are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A method of providing individual user to-do lists of actions from a software change management repository for managing software changes, the repository storing a set of changes requested by developers and end users of a given software system, the method comprising the computer implemented steps of:

in a processor coupled to the repository:
in response to a set of changes requested by developers and/or end users:
(i) forming, by the processor, and storing in the repository a respective change request object of a software bug to represent each person's respective request to make a respective software change to the given software system, and
(ii) for each change request object being stored in the repository, partitioning, by the processor, the change request object into an issue hierarchy of issue objects, a task hierarchy of task objects and an activity hierarchy of activity objects, wherein each issue object represents a respective issue, each task object defines work needed to address a respective issue and each activity object tracks respective work performed, and wherein each change request object has an issue hierarchy object type, a task hierarchy object type and an activity hierarchy object type; and
in response to a user accessing the repository, determining, by the processors, a user role of the user and generating a tabular user interface including a table representation of the respective issue hierarchy, task hierarchy and activity hierarchy of a change request object stored in the repository, the table representation serving as a to-do list of actions that the user is responsible for and displaying issue objects, task objects, and activity objects as a function of user role, wherein the processor uses the user role to select one of the issue hierarchy object type, task hierarchy object type and activity hierarchy object type in the change request object as primary for the user, and different ones of the issue hierarchy object type, task hierarchy object type and activity hierarchy object types serving according to user role as corresponding categories to the issue hierarchy of issue objects, task hierarchy of task objects and activity hierarchy of activity objects of the partitioning of the change request object;
wherein the table representation is formed of a respective row for each change request object, one or more first columns in the respective row holding and displaying fields of an issue object, task object or activity object of the change request object as a primary object according to user role, and one or more second columns in the respective row holding and displaying information about issue objects in the issue hierarchy, task objects in the task hierarchy and activity objects in the activity hierarchy of the change request object and that are linked to the primary object as sub-objects, and
wherein the information displayed by one or more of the second columns further includes summary values for a given row, each summary value resulting from a respective summary function of field values of corresponding sub-objects;
in response to command by the user, expanding, by the processor, the given row, said expanding displaying a sub-table having constituent values of the summary values of the given row, the constituent values for a given summary value being contributing values from the field values of corresponding sub-objects used in the respective summary function that produced the given summary value, and wherein the sub-table has one or more rows, each row representing a respective sub-object linked to the primary object of the change request object according to user role;

wherein the step of expanding is repeated upon user command for other rows of the table representation, expanding row by row and displaying respective sub-tables.

2. A method as claimed in claim 1 wherein
issue objects are able to be partitioned into issue sub-objects,
task objects are able to be partitioned into task sub-objects,
activity objects are able to be partitioned into activity sub-objects; and
wherein issue objects and issue sub-objects are able to be related to task objects and task sub-objects, and task objects and task sub-objects are able to be related to activity objects and activity sub-objects.

3. A method as claimed in claim 1 wherein for a given row of the table representation, indication of a primary object as a function of user role is displayed in a column intersecting the given row, the primary object being one of the issue hierarchy, task hierarchy and activity hierarchy object types, and
other columns intersecting the given row indicating sub-objects of the primary object.

4. A method as claimed in claim 1 further comprising the step of querying for potential new objects in the hierarchies of objects; and
responsive to the querying, the table representation displays added new rows of potential objects, one new row respectively for each potential object.

5. A method as claimed in claim 4 further comprising the steps of:
creating a new object from one of the potential objects, and
displaying an indication of the created new object in the table representation.

6. Computer apparatus for providing individual user to-do lists of actions in a repository based software change management system managing software changes of a subject software system, comprising:
a repository coupled in communication with a processor and storing in memory one or more change request objects of a software bug, each change request object representing a user's request to make a software change to a given software system, there being a different change request object for each different user making a respective user request;
a partitioning member executed by the processor and accessing the repository, for each change request object, the partitioning member partitioning the change request object into a respective issue hierarchy of issue objects, a task hierarchy of task objects and an activity hierarchy of activity objects, wherein each issue object represents a respective issue, each task object defines work needed to address a respective issue and each activity object tracks respective work performed, and wherein each change request object has an issue hierarchy object type, a task hierarchy object type and an activity hierarchy object type; and
a tabular user interface executable by the processor in response to interaction by a user, the tabular user interface including a table representation of the respective issue hierarchy, task hierarchy and activity hierarchy of a change request object stored in the repository, the table representation serving as a to-do list of actions for the user and displaying issue objects, task objects and activity objects as a function of user role, wherein the processor determines user role of the user and uses user role in selecting one of the issue hierarchy object type, task hierarchy object type and activity hierarchy object type in the change request object as primary for the user, and different ones of the issue hierarchy object type, task hierarchy object type and activity hierarchy object type serving according to user role as corresponding categories to the issue hierarchy of issue objects, task hierarchy of task objects and activity hierarchy of activity objects of the partitioning of the change request object;
wherein the table representation is formed of a respective row for each change request object, one or more first columns in the respective row holding and displaying fields of an issue object, task object or activity object of the change request object as a primary object according to user role, and one or more second columns in the respective row holding and displaying information about issue objects in the issue hierarchy, task objects in the task hierarchy and activity objects in the activity hierarchy of the change request object and that are linked to the primary object as sub-objects, and
wherein the information displayed by one or more of the second columns further includes summary values for a given row, each summary value resulting from a respective summary function of field values of corresponding sub-objects;
in response to command by the user, the processor expanding the given row and displaying a sub-table having contributing values from the field values of corresponding sub-objects used by the respective summary functions that produced the summary values of the given row, and wherein the sub-table has one or more rows, each row representing a respective sub-object linked to the primary object of the change request object according to user role for the user, and
the processor expanding other rows of the table representation, in response to user command, row by row and displaying respective sub-tables.

7. Computer apparatus as claimed in claim 6 wherein an issue object is partitioned into issue sub-objects, a task object is partitioned into task sub-objects, and an activity object is partitioned into activity sub-objects; and
the issue objects and issue sub-objects being related to task objects and task sub-objects, and the task objects and task sub-objects being related to activity objects and activity sub-objects.

8. Computer apparatus as claimed in claim 6 wherein for a given row of the table representation, indication of a primary object as a function of user role is displayed in a column intersecting the given row, the primary object being one of the issue hierarchy, task hierarchy and activity hierarchy object types, and
other columns intersecting the given row indicating sub-objects of the primary object.

9. Computer apparatus as claimed in claim 6 further comprising query means for querying the hierarchies of objects for potential new objects;
responsive to the query means, the table representation displays added new rows of potential objects, one new row respectively for each potential object.

10. Computer apparatus as claimed in claim 9 comprising means for creating a new object from one of the potential objects, the table representation displaying an indication of the newly created object.

11. Computer program product comprising:
a non-transient computer readable storage medium having a computer readable program, wherein the computer readable program when executed by a digital processor causes a computer to:
(a) form a change request object of a software bug to represent a user's request to make a software change to a given software system;

(b) partition the change request object into hierarchies of objects and sub-objects including at least a first hierarchy of respective first objects and sub-objects, and a second hierarchy of respective other objects and sub-objects, wherein the first objects, sub-objects and other objects of the first and second hierarchies include issue objects, task objects and activity objects, and wherein each issue object represents a respective issue, each task object defines work needed to address a respective issue and each activity object tracks respective work performed, and wherein each change request object has an issue hierarchy object type, a task hierarchy object type and an activity hierarchy object type;

(c) according to user role of a user, represent the hierarchies of objects and sub-objects in a table such that the table serves as a to-do list of actions for the user;

(d) display contents of the table as a function of user role by using user role to select one of the issue hierarchy object type, task hierarchy object type and activity hierarchy object type in the change request object as primary for the user, and different ones of the issue hierarchy object type, task hierarchy object type and activity hierarchy object type serving according to user role as corresponding categories to the issue hierarchy of issue objects, task hierarchy of task objects and activity hierarchy of activity objects of the partitioning of the change request object, wherein the table representation is formed of a respective row for each change request object, one or more first columns in the respective row holding and displaying fields of an issue object, task object or activity object of the change request object as a primary object according to user role, and one or more second columns in the respective row holding and displaying information about issue objects in the issue hierarchy, task objects in the task hierarchy and activity objects in the activity hierarchy of the change request object and that are linked to the primary object as sub-objects, and wherein the information displayed by one or more of the second columns further includes respective summary values for a given row, each summary value resulting from a respective summary function of field values of corresponding sub-objects; and (e) in response to command by the user, expand the given row, including displaying a sub-table having constituent values of the summary values of the given row, the constituent values for a given summary value being contributing values from the field values of corresponding sub-objects used in the respective summary function that produced the given summary value, and wherein the sub-table has one or more rows, each row representing a respective sub-object linked to the primary object of the change request object according to user role, and wherein said expanding is repeated upon user command for other rows of the table representation, expanding row by row and displaying respective sub-tables.

12. A computer program product as claimed in claim 11 wherein:
the first hierarchy is an issue hierarchy of issue objects and issue sub-objects;
the second hierarchy is a task hierarchy of task objects and task sub-objects, and
further including an activity hierarchy of activity objects and sub-objects, issue objects and issue sub-objects being able to be related to task objects and task sub-objects, and task objects and task sub-objects being able to be related to activity objects and activity sub-objects.

13. A computer program product as claimed in claim 11 further comprising computer code
(1) enabling querying for potential new objects in the hierarchies of objects;
   responsive to the querying, the table displays added new rows of potential objects, one new row respectively for each potential object; and
(2) enabling creating a new object from one of the potential objects, and displaying an indication of the created new object in the table.

14. Computer apparatus coupled with a processor for providing individual user to-do lists of actions from a software change management repository for managing software changes to a subject software system, the repository storing a set of changes requested by developers and end users, the apparatus comprising:
(a) means for forming and storing in the repository a change request object of a software bug in response to user request, the change request object representing a user's request to make a software change to the subject software system;
(b) means for providing hierarchies of objects and sub-objects for each change request object by partitioning the change request object in response to the user's request, the objects and sub-objects of the hierarchies resulting from said partitioning including issue objects, task objects and activity objects, wherein each issue object represents a respective issue, each task object defines work needed to address a respective issue and each activity object tracks respective work performed, and wherein each change request object has an issue hierarchy object type, a task hierarchy object type and an activity hierarchy object type, and (c) manager means responsive to a user interacting with the repository and representing the hierarchies of objects and sub-objects in a table as a function of user role of the user, including the manager means displaying contents of the table as a function of user role, the manager means using user role to select one of the issue hierarchy object type, task hierarchy object type and activity hierarchy object type in the change request object as primary for the user, and different ones of the issue hierarchy object type, task hierarchy object type and activity hierarchy object type serving according to user role as corresponding categories to the issue hierarchy of issue objects, task hierarchy of task objects and activity hierarchy of activity objects in the partitioning of the change request object;

wherein the table is formed of a respective row for each change request object, one or more first columns in the respective row holding and displaying fields of an issue object, task object or activity object of the change request object as a primary object according to user role, and one or more second columns in the respective row holding and displaying information about issue objects in the issue hierarchy, task objects in the task hierarchy and activity objects in the activity hierarchy of the change request object and that are linked to the primary object as sub-objects, and wherein the information displayed by one or more of the second columns further includes summary values for a given row, each summary value resulting from a respective summary function of field values of corresponding sub-objects;

in response to command by the user, the manager means expanding the given row, said expanding displaying a sub-table having constituent values of the summary values of the given row, the constituent values for a given summary value being contributing values from the field values of corresponding sub-objects used in the respective summary function that produced the given summary value, and wherein the sub-table has one or more rows, each row representing a respective sub-object linked to the primary object of the change request object according to user role, and wherein the manager means upon user command expands other rows of the table, expanding row by row and displaying respective sub-tables.

15. Computer apparatus as claimed in claim 14 wherein the subject software system is any of an applications program or a part thereof.

16. Computer apparatus as claimed in claim 14 wherein the manager means enables user querying for potential new objects in the hierarchies of objects, responsive to the querying, the table displays added new rows of potential objects, one new row respectively for each potential object; and the manager means enables user creation of a new object from one of the potential objects, the manager means displaying an indication of the created new object in the table.

* * * * *